United States Patent
Motz et al.

(10) Patent No.: US 6,664,900 B1
(45) Date of Patent: Dec. 16, 2003

(54) PROGRAMMABLE TRANSDUCER DEVICE

(75) Inventors: Mario Motz, Wernberg (AT); Michael Besemann, Freiburgi, Br. (DE)

(73) Assignee: Micronas GmbH, Freiburg (DE)

( * ) Notice: Subject to any disclaimer, the term of this patent is extended or adjusted under 35 U.S.C. 154(b) by 504 days.

(21) Appl. No.: 09/707,090

(22) Filed: Nov. 6, 2000

(30) Foreign Application Priority Data

Nov. 5, 1999 (DE) .......................................... 199 53 213
May 5, 2000 (DE) .......................................... 100 22 013

(51) Int. Cl.$^7$ ............................................. G08C 25/00
(52) U.S. Cl. ...................... 340/870.04; 327/58; 327/60; 327/68
(58) Field of Search ....................... 340/870.04, 870.37, 340/870.31, 501; 702/85, 104, 98, 138; 324/611, 601, 602, 606; 327/58, 60, 68, 37, 73

(56) References Cited

U.S. PATENT DOCUMENTS

| 4,845,449 A | 7/1989 | Stern et al. .................. 333/258 |
| 5,790,046 A | 8/1998 | Blossfield .............. 340/825.07 |

FOREIGN PATENT DOCUMENTS

| DE | 40 16 922 C3 | 11/1991 |
| DE | 44 22 867 A1 | 1/1996 |
| EP | 0 549 052 A2 | 6/1993 |
| EP | 0 578 124 A1 | 1/1994 |
| EP | 0 630 004 A2 | 12/1994 |
| EP | 0 845 660 A1 | 6/1998 |
| EP | 0 957 489 A1 | 11/1999 |
| EP | 1 028 425 A2 | 8/2000 |
| GB | 2 218 214 A | 11/1989 |
| WO | WO 99/64824 | 12/1999 |

OTHER PUBLICATIONS

"Programmierbares Sensor–Interface," MLX90308, *Elektor*, No. 11/98, pp. 72–75.
"User's Manual: Model 3051C Smart Pressure Transmitter" of the Rosemount Company, Manual 4622/4623, Aug. 1988.

Primary Examiner—Michael Horabik
Assistant Examiner—Hung Dang
(74) Attorney, Agent, or Firm—Samuels, Gautheir & Stevens, LLP

(57) ABSTRACT

A programmable transducer device that includes a signal source (e.g., a sensor) and a transducer output to output a transducer output signal and to receive a control signal from an external control unit. The control signal is superposed on the transducer output signal, and is detected at the transducer output from a resultant superposition signal by a detector circuit. The transducer output signal and the control signal may co-exist on the transducer output. Advantageously, providing a programmable transducer device that is actuated by control signals conducted through the transducer output and does not need to be switched over to a special receiving state, ensures the uninterrupted transmission of transducer output signals even while the control signals are received by the programmable transducer device. In addition, no additional signal path is required for programming.

11 Claims, 3 Drawing Sheets

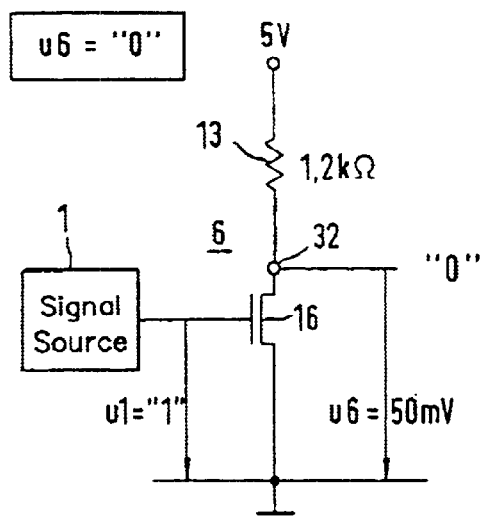
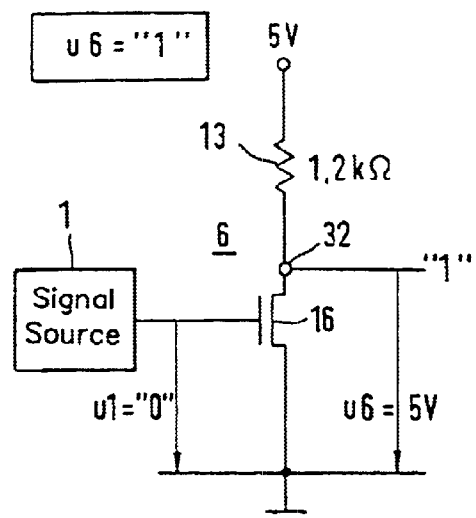
FIG. 3
FIG. 4
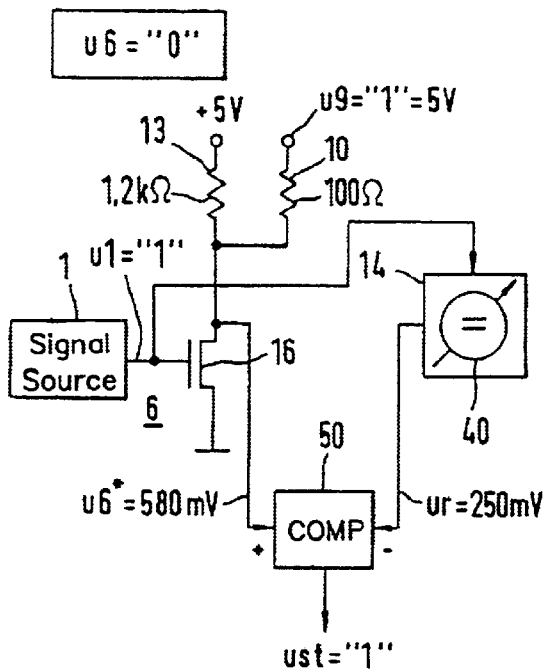
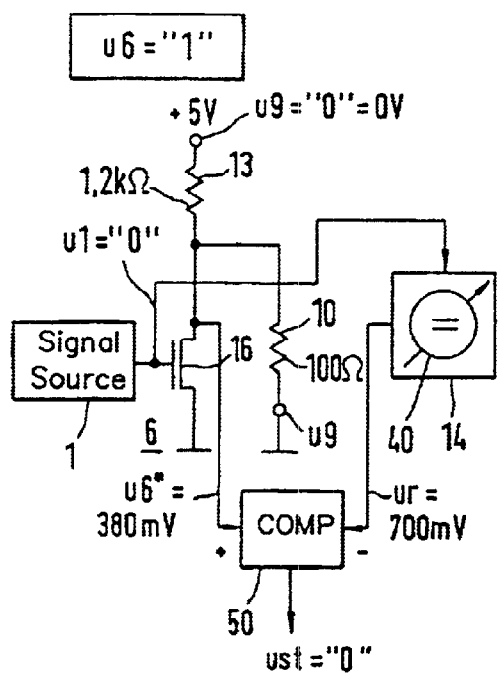
FIG 5
FIG 6

PROGRAMMABLE TRANSDUCER DEVICE

BACKGROUND OF THE INVENTION

The present invention relates to a programmable transducer device, and in particular to a programmable transducer device that receives a control signal that is superimposed onto the transducer device output signal.

A signal source in the transducer device may be a sensor for magnetic fields, pressure, temperature of the like, which is connected through an output circuit to the transducer output. The output signal (digital or analog) may be conducted via a signal line (e.g., a long signal line) to a receiver (e.g., a control unit). For certain applications, the transducer device may receive commands from the receiver. In this connection one can think of triggering a test operation for the transducer device or of switching in a signal source if, for example, a sensor for temperature and magnetic fields is present in the transducer device. When a sensor is present in the transducer device, it is often desirable to adjust the measurement range of the sensor or to compensate for an offset, which can have internal or external causes. Sometimes auxiliary circuits in the programmable transducer device must also be controlled (e.g., the frequency of a clock pulse generator or the current or voltage at the transducer output). This list is not exhaustive, but is only intended to show, by a few examples, that in many cases it is desirable that the transducer device can be programmed from the receiver.

If a three-legged housing is used for the programmable transducer device, one of the legs is generally permanently at ground potential, and thus only the supply connection and the transducer output are available for programming via the housing connections.

German patent application DE 44 22 867 A1 discloses using the supply connection for programming by modulating the magnitude of the supply voltage. This manner of transmitting a control voltage is often called operating voltage modulation. However, a protective circuit for the operating voltage input is often present, and thus the operating voltage can be varied only within a narrow range. This makes it impossible to input control signals, which must differ clearly from the operating voltage.

It is also known, similar to an input/output connection, that the transducer output can be used both for transmitting signals and for receiving signals. Such a bi-directional data exchange over one input/output data interface requires separate operating states for transmission and reception. However, setting such an operating state can be critical if set by an external signal, which is conducted to the transducer output. In particular, a proper noise signal at the transducer output may erroneously trigger its receiving state, in which the transducer device would then persist. The transducer device thus has been, as it were, shut off by the noise signal, and must first be turned on again.

Therefore, there is a need for a technique for making control signal information available to a programmable transducer device.

SUMMARY OF THE INVENTION

An object of the present invention is to provide a programmable transducer device that is actuated by control signals conducted through the transducer output, and which does not need to be switched over to a special receiving state.

Briefly, according to an aspect of the present invention, a transducer device receives an external control signal that is superposed on a transducer output signal line, and a detector circuit within the transducer device detects the control signal. An advantage of this arrangement is that the transducer device is not switched over to receive an external control signal, and consequently cannot be locked in the wrong operating mode. The control signal is detected in the detector circuit by a comparator device that compares the signal superposed on the transducer output line against a reference signal generated by a reference signal generation circuit.

In principle, it makes sense for the reference signal generating circuit to simulate the impedance of the transducer output stage. This includes suitable impedance simulation of a load, for example a resistor, connected to the transducer output. The impedance simulation circuit of the transducer output stage is sensibly driven by the same signal by which the actual transducer output stage is also driven. It is thus possible to obtain, as the reference signal, an image of the transducer output signal under nominal operating conditions. A control signal that acts on the transducer output leads to a deviation from nominal operating conditions.

The comparator device detects the control signal by detecting a clear deviation from the reference signal. If the transducer output signal is an analog voltage signal that can assume arbitrary values, then under normal operating conditions a current will flow in a resistive load, which can be simulated in the reference signal generation circuit. If a load current for the transducer output is known, given the nominal operating range of the transducer, a change of the load current can be recognized as the consequence of a change of the load on the transducer output. Instead, the impedance simulation circuit in the reference signal generation circuit simulates only the nominal load current. Clear deviations in the two signal levels then indicate a control signal, which can be detected in the detector circuit and can be processed in the transducer device.

If the transducer output provides a digital signal as its output signal, a simulation circuit of the output stage can also be used to form the reference signal. However, other reference signal sources (e.g., voltage sources for constant voltages) may also be used. When using voltage sources, the reference signal generation circuit suitably generates an associated comparison voltage as the reference signal, as a function of the particular logical state of the transducer output signal. If this comparison voltage is clearly exceeded above or below, this then indicates the presence of a control signal.

The control signals may be transmitted to the transducer device more reliably if the control signal includes an encoded data sequence, which is associated with a certain instruction in a decoder following the detector circuit. Data words can also be conducted to the transducer device as control signals by the data sequences. For example, these may be equalization data for the signal source, which are written into a memory coupled to the signal source. Suitable codes for safe transmission of individual control signals or of entire data words are also such codes by which the logical state "1" or "0" is not transmitted as a static bit value but rather by a change of the logical state within a certain time interval. This criteria would be the direction of the particular change or the presence or absence of such a change. Whether another change occurs outside this time interval is irrelevant. Such changes are easily detectable and make possible an equalized average pulse-pause ratio as well as transmission of a basic clock pulse for function control. Such codes are also known by the general term "biphase codes". These codes are also suitable for the asynchronous transmission of data, such that the original data sequence can easily be reconstructed again in the decoder by scanning.

Advantageously, providing a programmable transducer device that is actuated by control signals conducted through the transducer output and does not need to be switched over to a special receiving state, ensures the transmission of transducer output signals is not impaired and no additional signal path is required for programming.

These and other objects, features and advantages of the present invention will become more apparent in light of the following detailed description of preferred embodiments thereof, as illustrated in the accompanying drawings.

BRIEF DESCRIPTION OF THE DRAWING

FIGS. 3 and 4 illustrate the logical states at a digital transducer output;

FIGS. 5 and 6 illustrate the corresponding outputs in the superposition case;

DETAILED DESCRIPTION OF THE INVENTION

Figure 1:
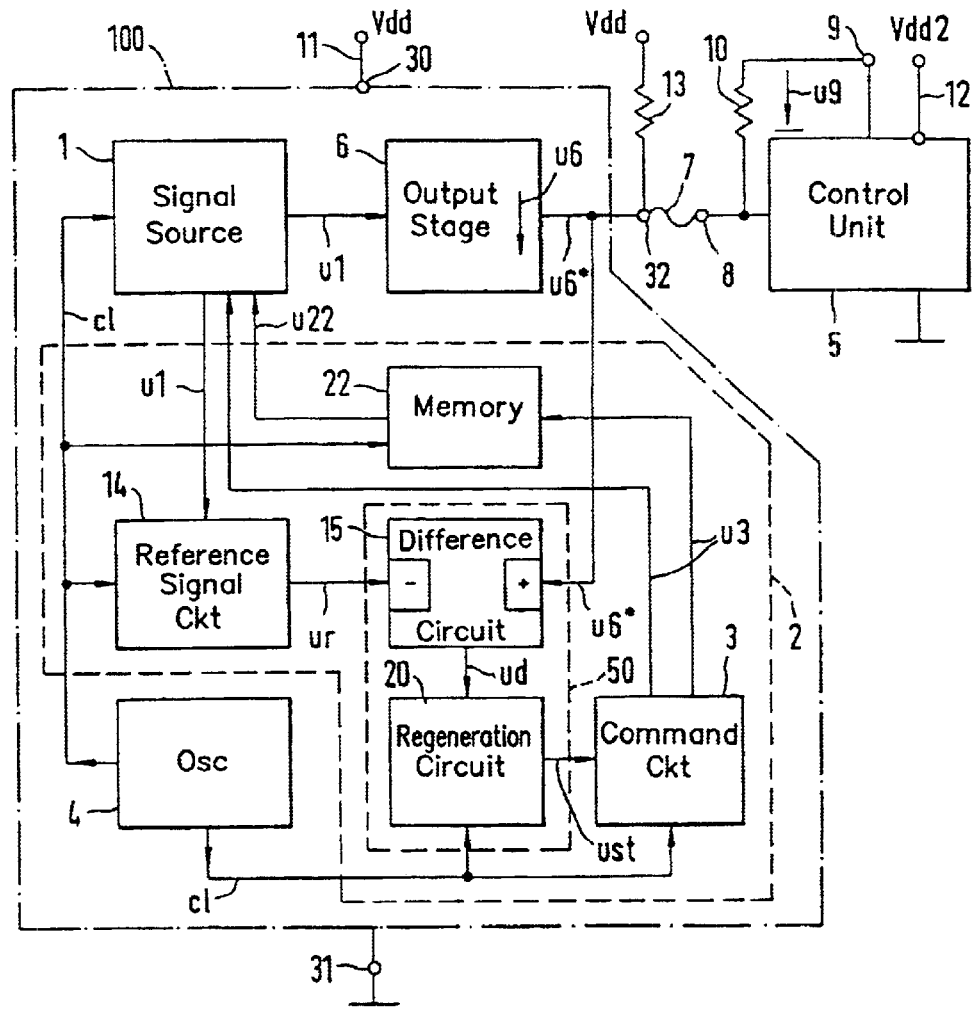
FIG. 1 is a functional block diagram illustration of a programmable transducer device connected to an external control device.

FIG. 1 is a block diagram illustration of a programmable transducer device 100. The output signal u1 of a signal source 1, which in particular can be a sensor, controls an output stage 6 and a reference signal generating circuit 14. The output stage 6 generates a transducer output signal u6, which is conducted to a transducer output connection 32. If this is an open-drain connection of an n-channel transistor, then a pull-up resistor 13, for example, to a positive supply voltage Vdd is necessary. In this embodiment, the supply voltage Vdd is also present at the supply connection 30 through a supply line 11.

The transducer output connection 32 is connected via an external signal line 7 to an external control unit 5. The control unit 5 evaluates the transducer output signal u6, which has been received by the transducer device 100 at the input connection 8. The control unit 5 has a control signal output 9 that is connected via a modulation resistor 10 to the control unit input 8, and thus via the signal line 7 to the transducer output connection 32. The control unit input connection 8 preferably has a high-ohm impedance, and has no influence on the signal level modulation. Voltage is supplied to the control unit 5 through a supply line 12 that furnishes a second supply voltage Vdd2. The second supply voltage Vdd2 may be the same as or different from the supply voltage Vdd of the transducer device. However, in the interest of simplicity it is assumed that the supply voltage Vdd2 is the same as the supply voltage Vdd, and that the control signal output 9 can be switched back and forth at a low impedance between the supply voltage Vdd2 and ground potential by the control unit 5, in accordance with the desired control signals u9. The current in the output stage 6 is thus changed via the modulation resistor 10. A detector circuit 2 detects this change in the current or voltage. Specifically, the detector circuit 2 compares the theoretical value of the output stage 6 with the value of the actual signal u6* at the transducer output 32. From the difference between these two signals, the detector circuit 2 determines whether a control signal u9 has been received from the control unit 5.

For the comparison, the detector circuit 2 receives (i) a reference signal ur from the reference signal generating circuit 14 and (ii) the output signal u6*. A comparator device (e.g., a comparator 50) compares the two signals. For comparing a voltage, the comparator 50 includes a difference circuit 15 followed by a regeneration circuit 20 with prescribed switching thresholds for better suppression of noise signals. The signals u6* may also be referred to herein as the superposition signals. If the transducer output signal u6 is modulated by the control signal u9, then the superposition signal u6* clearly differs from the reference signal ur. The difference circuit 15 generates a difference signal indicative of the difference between the reference signal ur and the superposition signal u6*, and transmits this difference signal to the regeneration circuit 20 so the received control signal u9 can be recovered internally. If the signals are processed under a clock pulse, the processing clock pulse can have a much higher frequency than the data rate of the control signal u9. This corresponds to a scanning of the superposition signal u6*. This can simplify the evaluation in the transducer device 100; above all else, it is not necessary to couple the clock pulse systems of the transducer device 100 and of the control unit 5. The logical level of the output signal ust from the regeneration circuit 20 again corresponds to that of the original control signal u9. The output signal ust is input to a command circuit 3, which serves as an internal control device in the transducer device 100. The bit sequence of the internal control signal ust triggers instructions u3 in the control circuit 3. These instructions are conducted, for example, to the signal source 1 or to other stages.

The control unit 5 can also transmit data to the transducer device 100 via of the control signals u9. These data can then be stored, for example, by the command circuit 3 in a memory 22 coupled to the signal source 1. The data may contain, for example, equalization data u22 for the signal source 1 to match it to the particular operating conditions or to equalize an offset. To operate the transducer device 100, an oscillator 4 can also be integrated with the device to generate a clock pulse signal c1 that controls the time process within the transducer device. The described adjustment of the signal source 1 is greatly simplified by the single data connection between the transducer device and the control unit 5, since the adjustment process and the measurement process can take place simultaneously. Significantly, without the invention, the adjustment would have to occur in another time interval, because the bi-directional data connection would then have to be switched between transmission and reception.

Figure 2:
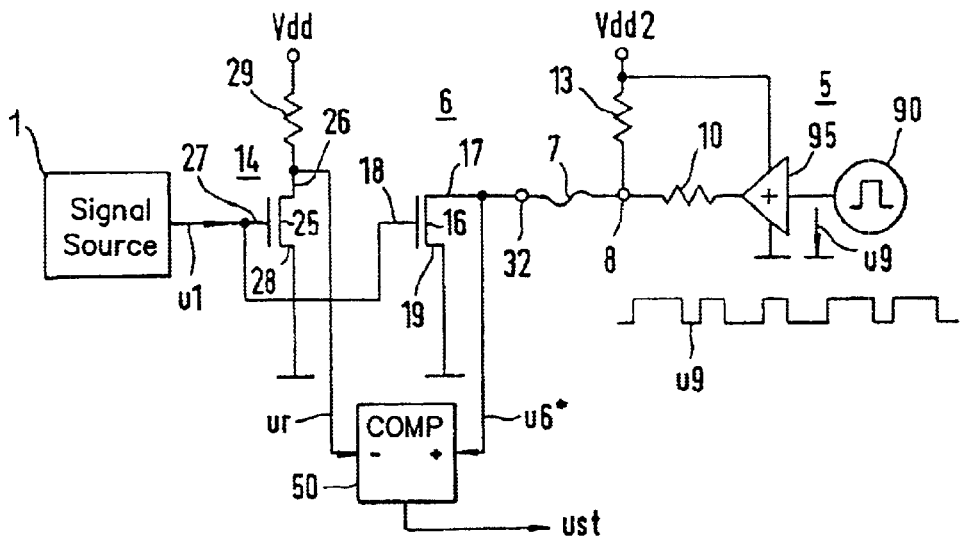
FIG. 2 illustrates an open-drain output stage with an impedance simulation circuit.

FIG. 2 is a schematic illustration of an output stage 6 for transmitting digital transducer output signals with an n-channel transistor 16 in open-drain connection and with an associated external load resistor 13. The associated reference signal generation circuit 14 contains an equivalent impedance simulation circuit to generate the reference signal ur. The impedance simulation circuit includes an n-channel transistor 25 and an ohmic load resistor 29, which lies at the supply voltage Vdd. The gate connections 18, 27 of the two transistors 16, 25 respectively, are supplied with the output signal u1 from the signal source 1. The source connections 19, 28 are connected to ground potential. The load resistor of the open-drain connection 17 is formed, via the signal line 7, by the pull-up resistor 13. The simulation of the pull-up resistor 13 is the pull-up resistor 29 in the reference signal generating circuit 14. The pull-up resistor 29 is situated between the supply voltage Vdd and the drain connection 26. The simulation transistor 25 can be much smaller than the actual output transistor 16 if the currents are also reduced correspondingly. As is well-known, the required similarity is not lost by such scaling.

The reference signal ur is tapped at the drain connection 26 of the transistor 25, and the superposition signal u6* is tapped at the drain connection 17 of the transistor 16. The control unit 5 includes a control signal generator 90 that generates the control signal u9. The control signal u9 becomes sufficiently low-ohm via an external driver 95 to drive the modulation resistor 10. Thus, the digital control signal u9 modulates the voltage present at the control unit input 8. This voltage is formed there by the output stage 6 as a function of the signal u1. The logical state of the output signal ust from the comparator 50 corresponds to the logical state of the received control signal u9. Consequently, to distinguish it from the external control signal u9, it will be designated below as the internal control signal.

FIG. 3 illustrates the conducting state of the transistor 16 with a transducer output signal u6 at logical state "0". With an assumed 1200 ohm load resistor 13, and with an assumed 5 V supply voltage, the transducer output signal u6 has, for example, a value of about 50 mV. FIG. 4 illustrates the non-conducting operation of the transistor 16 in which the transducer output signal u6 corresponds to the logical state "1". The drain connection of the nonconducting transistor 16 is raised by the pull-up resistor 13 to the supply potential Vdd, for example 5 V.

FIGS. 5 and 6 illustrate an improved variant of the reference signal generating circuit 14, which furnishes two reference signal levels at its output. The reference signal levels are formed by a controlled voltage source 40 whose control input is controlled by the output signal u1 of the signal source 1, so as to prescribe the reference signal ur in dependence on the particular logical output state "0", "1" of the transistor 16. The logical state of the output stage 6 of FIG. 5 or FIG. 6 corresponds to the logical stage of FIG. 3 or respectively FIG. 4. In FIG. 5, the controlled voltage source 40 generates a first reference signal ur value that clearly lies above the transducer output signal of 50 mV and, for example, has a value of 250 mV. In FIG. 6, the controlled voltage source generates a second reference signal ur with a value that is clearly above the signal level generated at the transducer output when the control signal assumes logical "0"; for example, the reference signal may have a value of 700 mV.

Referring to FIG. 5, the external control signal u9 corresponds to a logical "1", and thus has a voltage value of 5 V. The modulation resistor 10 lies in parallel with the pull-up resistor 13 between the drain connection of the conducting transistor 16, which, for example, has an internal resistance of 12 ohms, and with the supply voltage Vdd of 5 V. The load effect of the 1200 ohm pull-up resistor 13 is multiplied by more than a factor of ten by the low-ohm modulation resistor with its 100 ohms, as a result of which the saturation voltage of the n-channel transistor 16 rises to a value of about +580 mV since the current is ten times as large. Such a voltage clearly lies above the given reference signal ur of +250 mV, as a result of which the comparator 50 generates an internal control signal ust with the logical state "1". A control signal u9 with the logical state "1" is thus detected, if the logical state of the transducer output signal u6, which depends on the logical state of the signal source 1, corresponds to the logical state "0".

Referring to FIG. 6, the transducer output signal u6 corresponds to the logical state "1", and the external control unit 5 transmits an external control signal u9 with the logical state "0". The equivalent circuit for forming the superposition signal u6* differs from the one of FIG. 5 in that the n-channel transistor 16 is non-conducting. The superposition signal u6* formed from the supply voltage Vdd by the voltage divider that includes the load resistor 13 and the modulation resistor 10, now assumes a value of +380 mV, and is thus clearly lower than the pure 5 V transducer output signal u6 of FIG. 4. Due to the logical "1" of the transducer output signal u6, the controlled voltage source 40 in FIG. 6 generates a reference signal ur of +700 mV, which lies at the negative input of the comparator 50. The voltage comparison between the superposition signal u6* and the reference signal ur delivers a difference signal ud of −320 mV. The comparator 50 thus detects the presence of an external control signal u9 with the logical state "0". Without the external control signal u9, the difference signal ud would have a value of +4.3 V. This value indicates that the external control signal u9 either has the logical state "1" or is not present at all.

Figures 7, 8:
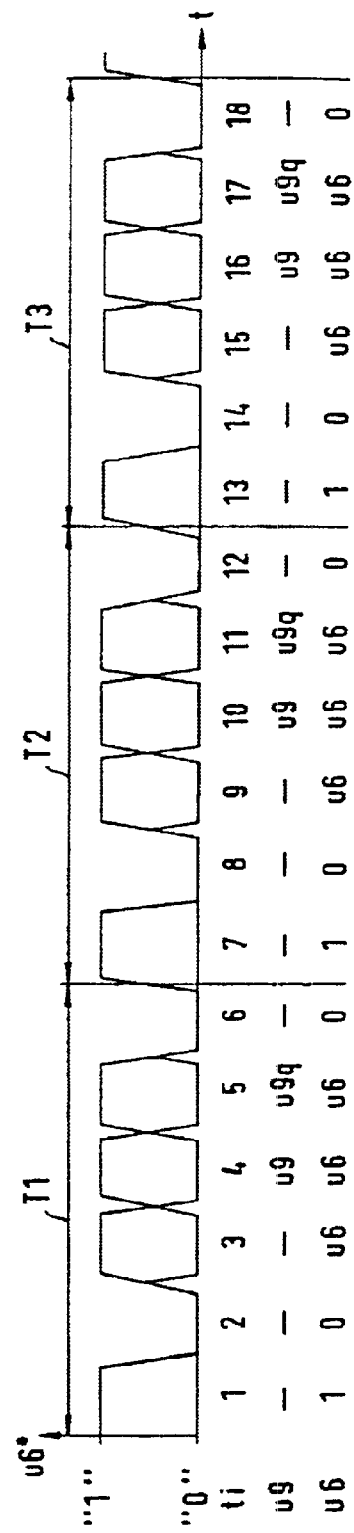
FIG. 7 illustrates the starting levels for FIGS. 5 and 6, in the form of a table.
FIG. 8 illustrates a timing diagram of a process scheme in digital operation.

In FIG. 7, the individual logical states corresponding to FIGS. 5 and 6 are shown in the form of a table. The first column, in successive rows, indicates the two transducer output signals u6 with the logical state "0" and the logical state "1". The second column provides the two associated reference signals ur with 250 mV and 700 mV. The third and fourth column specifies whether the superposition signal u6* is greater or less than the associated reference signal ur. Here, the third or fourth column applies to the control signal u9 with the logical state "0" and "1", respectively. The rows of columns 3 and 4 are shown as double rows, with the upper double row comparing the pure transducer output signal u6 with the reference signal ur—this also corresponds to cases in which no control signal u9 is transmitted. This state is caused, for example, by a "tristate" (i.e., high-ohm state) at the control signal output 9. In two cases, the comparison signs ">" and "<" are emphasized by being enclosed in a circle. Only in these two cases, does the superposition signal u6* change the sign of the comparison from that of the pure transducer output signal u6. In these cases, the presence of a control signal u9 and its logical state in the transducer device 100 can be unambiguously determined.

However, with a suitable process control between the transducer output signal and the control signal u9, the control signal u9 transmitted by the control unit 5 can be reliably detected in all cases by the transducer device 100. FIG. 8 illustrates an example of this as a possible process diagram of the superposition signal u6*. The oscillator 4 (FIG. 1) present in the transducer device 100 generates a clock pulse c1 that forms successive clock pulse groups T1, T2, T3. The clock pulse groups are used, among other purposes, for the time synchronization of the transducer device 100 and the control unit 5. In the assumed example, each clock pulse group T1, T2, T3 includes six cycles ti, which are numbered successively to differentiate them. The beginning of each clock pulse group (compare ti=1, 7, 13) is formed by a synchronization pulse, at which the transducer output signal u6 necessarily assumes the logical state "1". The clock pulses ti=2; 6, 8; 12, 14; 18, situated directly before and afterwards, necessarily have the logical state "0". The following clock pulses ti=3, 4, 5; 9, 10, 11; 15, 16 17 correspond to the desired transducer output signal u6. In addition, the time-synchronized control unit 5 transmits the control signal u9 during the pulses ti=4, 10, 16, and transmits the inverted control signal u9 during the pulses ti=5, 11, 17. In accordance with the table set forth in FIG. 7, the correct logical state of the control signal u9 can be determined unambiguously either from the normal control signal u9 or from the inverted control signal u9. One of ordinary skill will recognize that the process diagram of FIG. 8 is merely one embodiment. The principles used here are thereby clarified and include other embodiments, for example the above-mentioned biphase coding, in which the control signal u9 changes its logical state in the positive and negative direction at every measurement moment, so that this change can be reliably detected by the transducer device 100 in every case.

If higher or lower voltages than the supply voltage Vdd and ground are permissible for the transducer output 32, and if these levels can be detected by the detector circuit 2, then naturally a corresponding control signal u9 also is always detectable.

Although the present invention has been shown and described with respect to several preferred embodiments thereof, various changes, omissions and additions to the form and detail thereof, may be made therein, without departing from the spirit and scope of the invention.

What is claimed is:

1. A programmable transducer device, comprising:
    a signal source including an output stage that provides a transducer output signal on a transducer output connection;
    a reference signal source that provides a reference signal;
    a detector connected to said transducer output connection to receive a superposition signal that includes said transducer output signal and a control input signal, wherein said detector also receives said reference signal and compares said superposition signal and said reference signal to determine if said superposition signal includes said control input signal, and provides a detector output signal indicative of whether or not said control input signal is indeed superimposed on said transducer output signal.

2. The programmable transducer device of claim 1, wherein said reference signal source comprises a simulation circuit to simulate said output stage in order to form said reference signal.

3. The programmable transducer device of claim 2, wherein said transducer output signal comprises an analog signal that includes arbitrary intermediate values within a modulation range.

4. The programmable transducer device of claim 1, wherein said transducer output signal comprises a digital signal, and said reference signal generating circuit generates a fixed comparison quantity as a function of the particular state of said signal source or said transducer output signal.

5. The programmable transducer device of claim 1, wherein said control input signal is encoded and includes a data sequence.

6. The programmable transducer device of claim 5, comprising a command circuit that generates a command signal in response to said detector output signal.

7. The programmable transducer device of claim 5, wherein the data sequence of said control input signal includes a data word.

8. The programmable transducer device claim 6, wherein said data word contains equalization data for said signal source that is written into a memory device coupled to said signal source.

9. A programmable transducer device, comprising:
    a sensor that provides a transducer output signal on a transducer output connection;
    means for providing a reference signal; and
    a detector circuit connected to said transducer output connection to receive a superposition signal, wherein said detector circuit also receives said reference signal and compares said superposition signal and said reference signal to determine if said superposition signal includes a control input signal, and provides a detector output signal indicative of whether or not said control input signal is superimposed on said transducer output signal to form said superposition signal.

10. The programmable transducer device of claim 9, wherein said detector circuit includes a comparator that comprises:
    a difference circuit responsive to said superposition signal and said reference signal, and provides a difference signal value indicative of the difference between said reference signal and said superposition signal; and
    a regeneration circuit responsive to said difference signal, for regenerating said received control input signal and providing a signal indicative thereof.

11. A programmable transducer device, comprising:
    a sensor that provides a transducer output signal on a transducer output connection;
    a reference signal generating circuit that provides a reference signal; and
    a detector circuit connected to said transducer output connection to receive a superposition signal, wherein said detector circuit also receives said reference signal and compares said superposition signal and said reference signal to determine if said superposition signal includes a control input signal, and provides a detector output signal indicative of whether or not said superposition signal includes control input signal.

* * * * *